June 15, 1943.  A. G. RIVARD  2,321,703
ATTACHMENT FOR LUNCH-BOXES
Filed May 21, 1940

Inventor
Alfred G. Rivard
By Lyon & Lyon
Attorneys

Patented June 15, 1943

2,321,703

UNITED STATES PATENT OFFICE 2,321,703

ATTACHMENT FOR LUNCH BOXES

Alfred G. Rivard, Los Angeles, Calif., assignor of one-third to Fernando C. Marzo Application May 21, 1940, Serial No. 336,398

4 Claims. (Cl. 126—261)

This invention relates to lunch-boxes, or lunch-kits, and the object of the invention is to provide an attachment for a lunch-box, which will occupy very little space in the interior of the lunch-box, but which can be extended or pulled out from the lunch-box and used for cooking food or heating water for making coffee or tea.

In the preferred embodiment of the invention, it includes a tray constructed as a drawer to be pulled out at the bottom of the lunch-box; and one of the objects of the invention is to provide the tray with means to cooperate with a burner to confine the flame for the burner so as to conserve the heat, and at the same time provide a perforated cover plate on which a pot or cooking vessel can rest; also to construct the tray and cover in such a way that when set up for cooking purposes the flame from the burner will be substantially protected from the wind thereby, at the same time providing for an ample supply of air to support combustion at the burner.

A further object of the invention is to provide a tray and a movable cover attached to the tray, capable of cooperating with the tray to provide a temporary housing or casing for a burner while the burner is being used, the cover being so constructed that it is capable of folding back into the tray in a horizontal position, so that the interior of the cover will provide packing space when the attachment is not in use for cooking food, or boiling water.

Further objects of the invention will appear hereinafter.

The invention consists in the novel parts and combination of parts to be described hereinafter, all of which contribute to produce an efficient attachment for lunch-box.

A preferred embodiment of the invention is described in the following specification, while the broad scope of the invention is pointed out in the appended claims.

Figure 1:
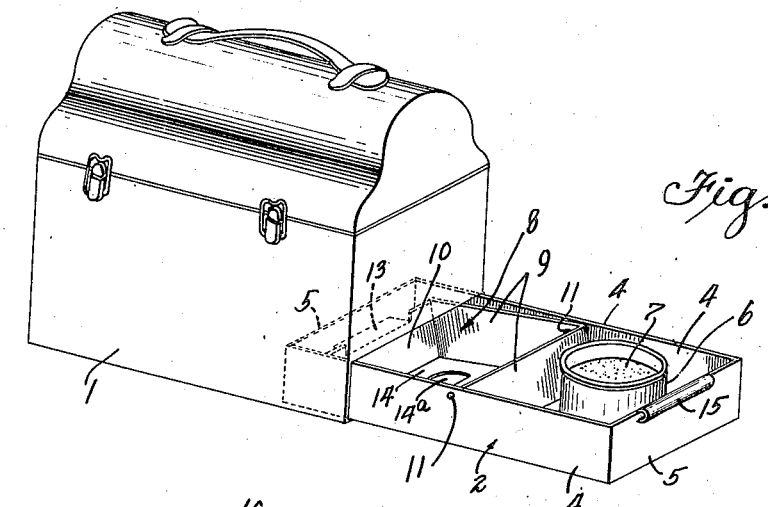
Fig. 1 is a perspective of a lunch-box embodying my invention and indicating my attachment partially pulled out from the lunch-box as it would be when the apparatus is about to be used.

In practice, the invention may be applied to a lunch-box of any construction, but is preferably applied to a lunch-box of box-form such as the lunch-box 1 illustrated in Fig. 1. This lunch-box would have a false bottom below which the tray 2 of my invention would be located, the construction being such as to permit the tray to be pulled out like a drawer whenever it is to be used. The tray 2 consists simply of an open drawer having a bottom 3, side walls 4, and end walls 5. In practicing the invention I prefer to provide for carrying a burner 6, or for supporting this burner at one end of the tray, and preferably at its outer end. Although this burner 6 could be constructed as a permanent part of the tray, in the present instance it is illustrated as a separate burner consisting of a can. These cans containing an inflammable substance 7 can be procured on the market, and after removing the cover of the can, a lighted match can be applied to the substance, which will burn with a flame developing considerable heat.

In accordance with my invention I provide a movable cover 8 that is associated with the tray 2 in such a manner that when not in use it can be held in the inner end of the tray in an inverted position. This cover has no bottom, and hence when it is in its inverted position, the interior of the cover forms a packing space in which articles of food, or a bottle of alcohol, or any other substance can be carried for use in connection with the burner 6, assuming that in such a case the burner would be of a different type than that referred to above, that is to say, an ordinary type of alcohol burner.

Figure 2:
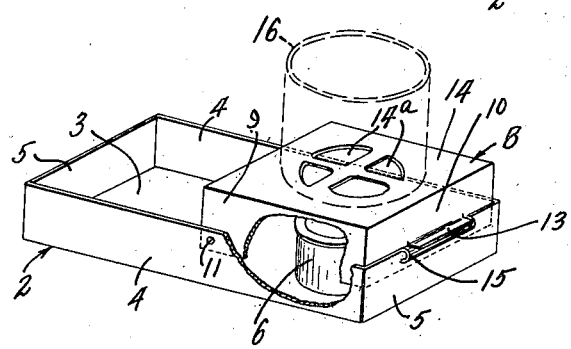
Fig. 2 is a perspective showing the tray completely removed from the lunch-box and with the folding cover set up to provide a housing for the burner. In this view a portion of the side wall of the tray and cover are broken away so as to display the burner on the inside of the burner housing.
Figure 3:
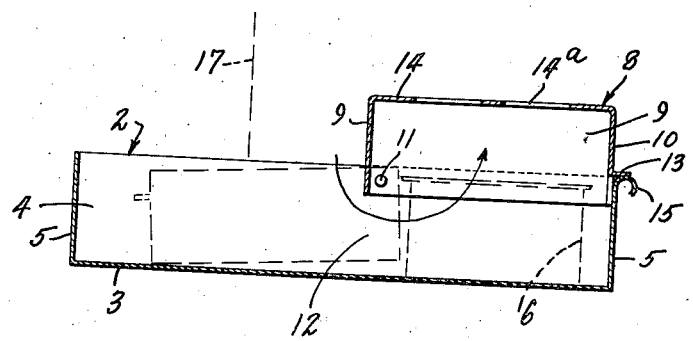
Fig. 3 is a longitudinal vertical section through the set up tray illustrated in Fig. 2, but merely showing the burner in dotted outline. In this view the burner cover is shown in dotted lines in its folded position down inside of the tray.

The cover 8 is constructed in such a way that it can be removed from the bottom of the tray and applied in an upright position such as that indicated in Figs. 2 and 3. In this position it will cooperate with the tray to form a substantially closed housing for the burner. This is illustrated in Fig. 3, in which the burner 6 is indicated in dotted lines. In order to accomplish this, the cover 8 is preferably formed with walls 9 on three sides, and a front wall 10. The width of the cover is slightly less than that of the tray, so as to permit it to nest nicely within the same.

The cover 8 is preferably connected by pivot pins 11 to the side walls 4 of the tray. These pivot pins are preferably located near the upper edge of the side walls 4 and near the bottom edge of the walls 9 of the cover. The result of this is that when the cover is set up in its operating position as illustrated in Fig. 3, the lower edges of the walls 9 will lie adjacent to the inner faces of the side walls 4 of the tray, and substantially enclose the burner on three sides, but leave a space at the point 12 through which air for combustion can pass into the burner as indicated by the arrow in Fig. 3.

At the forward side of the wall 5, a portion of the lower edge of the wall 10 is bent upwardly to form a flange or stop 13 to hold the cover so that its top plate 14 is substantially horizontal.

In order to cooperate with this flange or lip 13, and also to facilitate pulling the tray 2 outwardly as a drawer, I provide the upper edge of the forward wall 5 with an integral roll 15. This roll operates as a handle for pulling the drawer out, and the upper side of the roll operates as a seat for the flange 13 (see Fig. 3).

The top wall or cover wall 14 of the cover, if desired, may be provided with openings 14ª through which the flame from the burner can have direct contact with the bottom of a cooking vessel 16 indicated in dotted lines in Fig. 2.

One of the advantages of this construction is that the cover and the tray cooperate to produce a housing that will effectively screen the flame from the wind. This is particularly desirable when the lunch-box is used by campers or persons on a picnic. Furthermore, it will be evident that in the use of the device, after the cover 8 has been set up, the tray can be pushed partially back into the lunch-box; for example, as illustrated in Fig. 3, in which the dotted line 17 indicates the location of the adjacent wall of the lunch-box. In this position the lunch-box, of course, operates to assist in excluding the wind from the opening 12 under the adjacent wall 9. This operates as an additional protection from the wind.

Many other embodiments of the invention may be resorted to without departing from the spirit of the invention.

What I claim is:

1. In an attachment for a lunch-box, the combination of a tray to be movably carried in the lunch-box, a burner carried by the tray, and a cover pivotally attached to the tray lying within the tray when carried in the lunch-box, and capable of swinging on its pivotal connection so as to come into position over the burner when the tray has been withdrawn from the lunch-box, to support a cooking utensil to be heated.

2. In an attachment for a lunch-box, the combination of a tray to be movably carried in the lunch-box, a burner carried by the tray, and a cover for the burner of substantially box-form composed of substantially vertical side walls and a substantially horizontal top wall, said cover pivotally attached to the tray at an intermediate point of the tray and capable of folding over into a folded position within the tray, in which the cover lies in an inverted position, thereby providing a storage chamber for accessory articles.

3. In an attachment for a lunch-box, the combination of an open tray in the form of a drawer mounted so as to slide out from the same, a burner carried in the tray at the end thereof remote from the box, a cover open on its bottom side having side walls pivotally attached to the side walls of the tray and having a top wall, said cover capable of assuming a position to overlie the burner with its outer end supported adjacent the outer wall of the tray for supporting a cooking or heating vessel over the burner, when the tray has been withdrawn from the lunch-box, said cover also being capable of swinging on its pivotal connection so as to fold down into the tray with the open bottom of the cover uppermost to provide a packing space within the cover.

4. In an attachment for a lunch-box, the combination of a tray to be movably carried in the lunch-box, and capable of being extended from the lunch-box, a burner carried by the outer end of the tray, and a cover pivotally attached to the tray lying within the tray toward its inner end when carried in the lunch-box, and capable of swinging on its pivotal connection so as to come into position over the burner to support a cooking utensil to be heated when the tray has been withdrawn from the lunch-box.

ALFRED G. RIVARD.